Aug. 27, 1929.　　　　E. HARMES　　　　1,726,022
MOLDING MACHINE AND VALVE THEREFOR
Filed Oct. 18, 1926　　　5 Sheets-Sheet 1
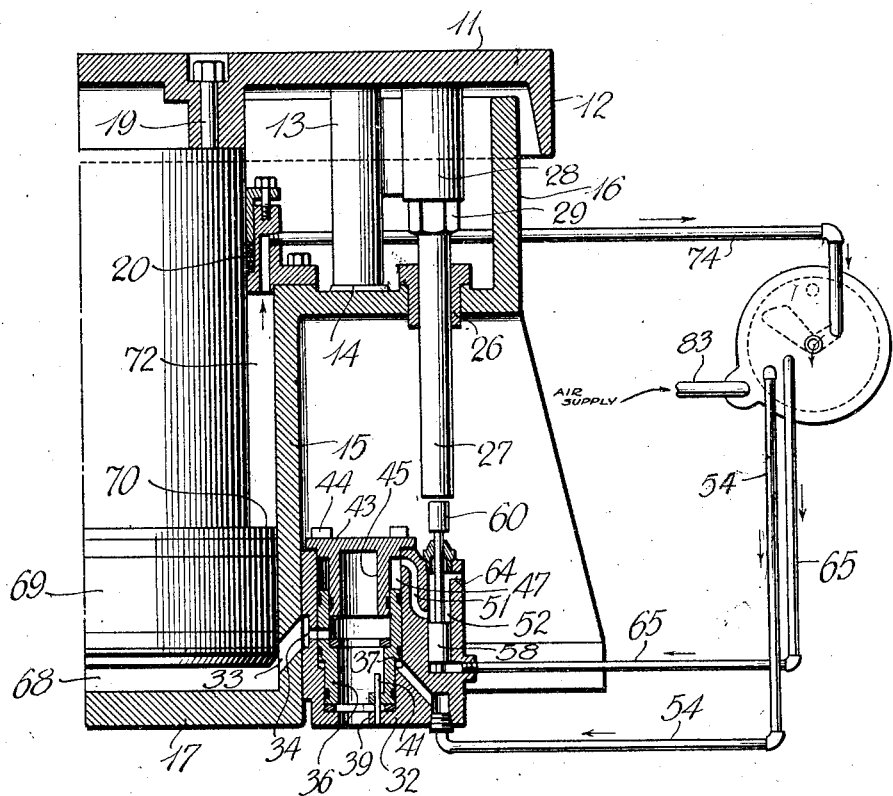
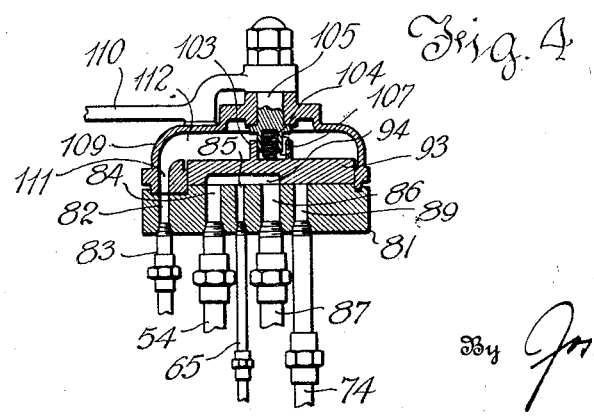
Inventor
Edward Harmes
By Joseph W. Hazell
Attorney

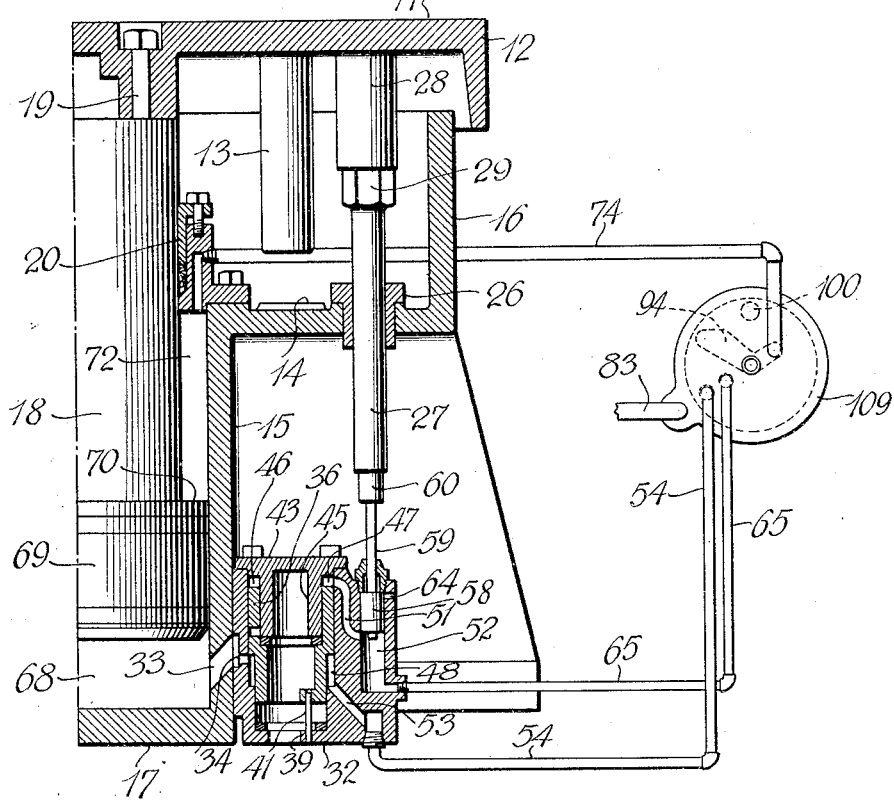
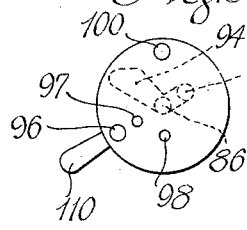
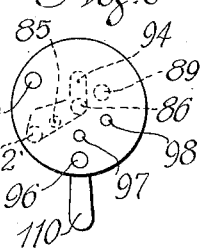
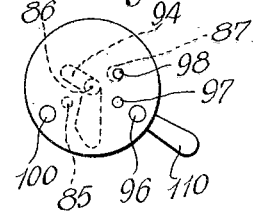
Inventor
Edward Harmes
By Joseph W. Hazell
Attorney

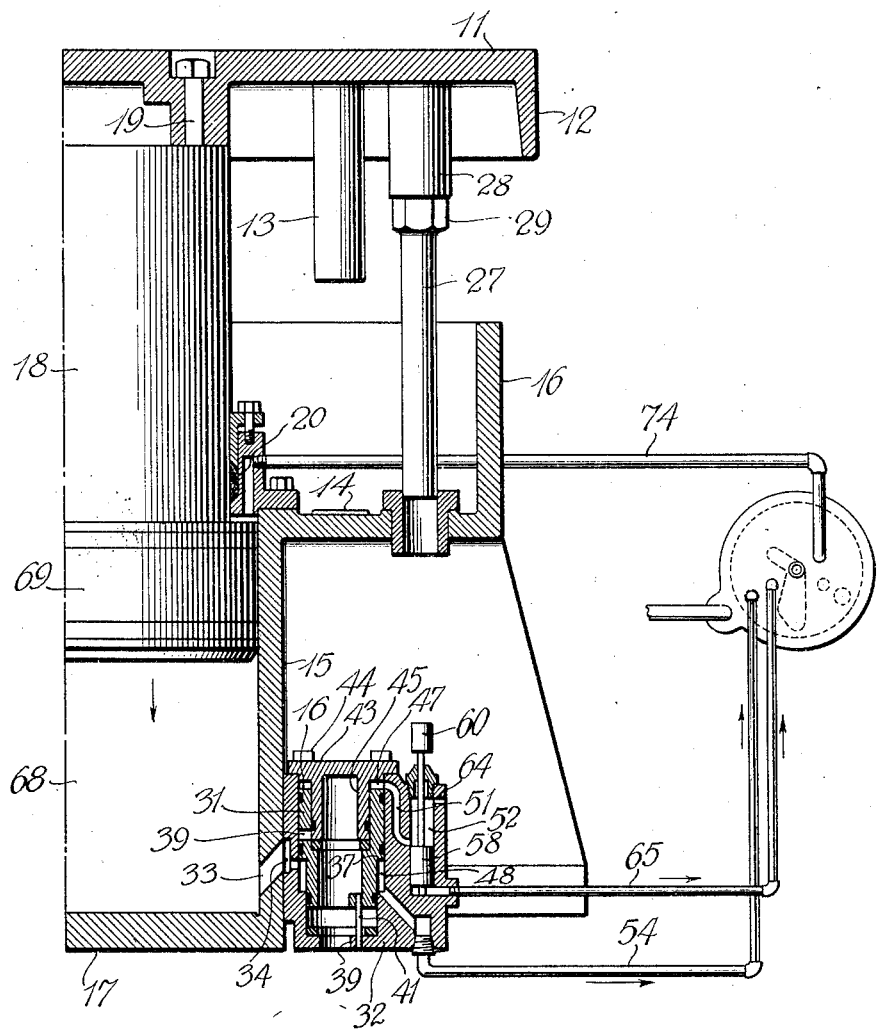

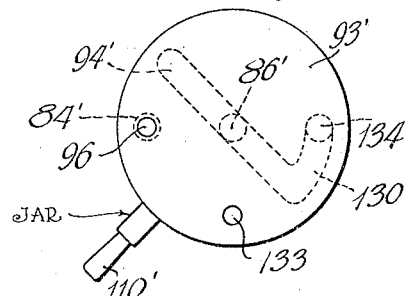
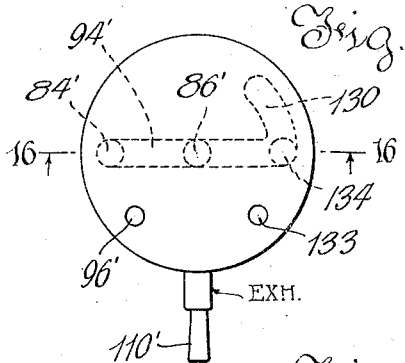
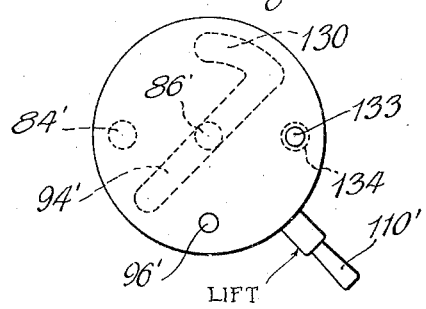
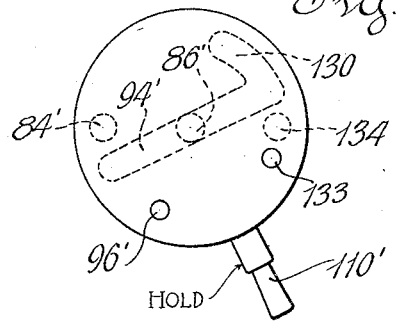
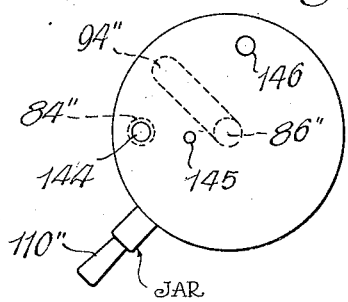
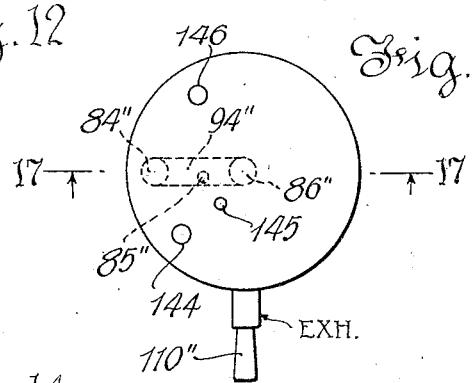
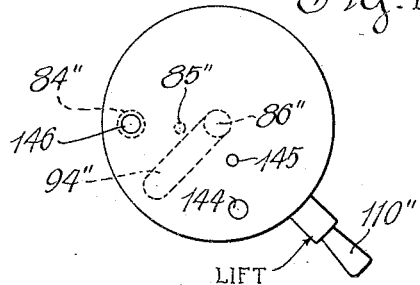
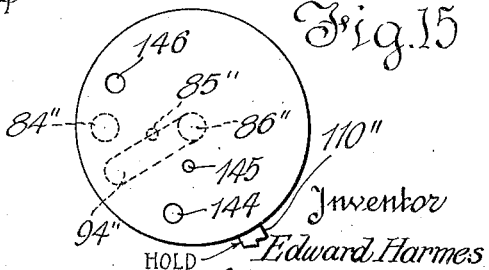

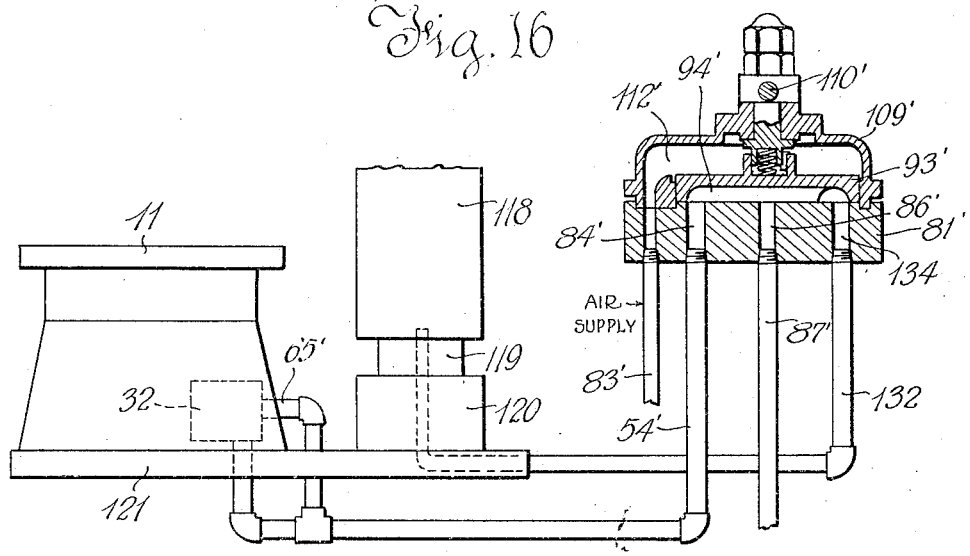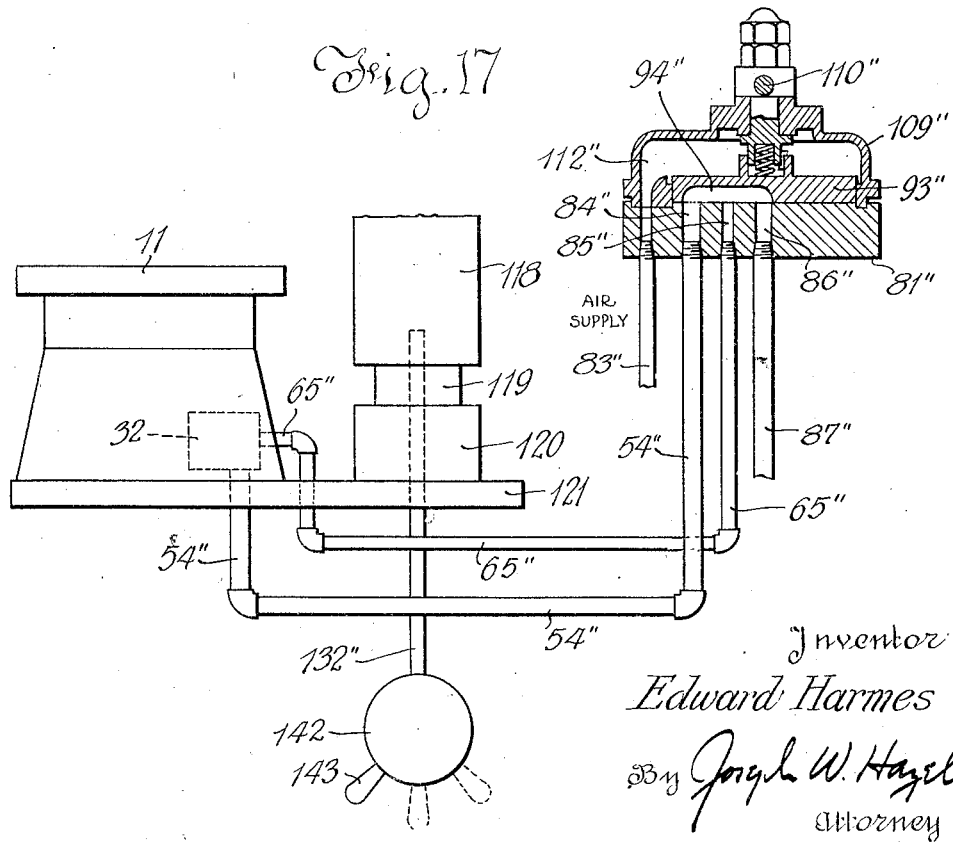

Patented Aug. 27, 1929.

1,726,022

UNITED STATES PATENT OFFICE.

EDWARD HARMES, OF WILKINSBURG, PENNSYLVANIA, ASSIGNOR TO NEW PROCESS MULTI-CASTINGS COMPANY, A CORPORATION OF NEW JERSEY.

MOLDING MACHINE AND VALVE THEREFOR.

Application filed October 18, 1926. Serial No. 142,167.

The present invention relates to foundry molding machines and valves therefor of the type in which a jarring table or a jarring and lifting table is provided for the purpose of packing the molding sand in the flask parts.

The invention is particularly adapted to the class of machines in which a single flask forms a part of the machine and makes any desired number of complete sand molds ready for pouring without any removal of the flask from the machine, although the invention, particularly in certain forms thereof, is equally well adapted to any molding machine provided with a jarring table.

One of the objects of the invention is to provide jarring mechanism actuated by fluid under pressure, such as air, which is automatic and continuous in action and is also absolutely smooth in operation.

Another object of the invention is to provide, in connection with the foregoing jarring mechanism, an actuating valve mechanism including an actuating valve proper associated with a pilot valve controlling the same whose function is to provide automatically for controlling the flow of fluid under pressure to accomplish the necessary reversal of movement of the parts required for continuous and automatic jarring.

Another object of the invention is to provide means moved by the jarring table for coacting with and controlling movement of the foregoing pilot valve.

A further object of the invention is to provide, in connection with the foregoing mechanism, a hand-actuated control valve which serves in one position to produce continuous jarring of the operating table, in another position to effect a long lift of the operating table without jarring, and in one of the embodiments thereof to admit air on opposite sides of the lifting piston, exerting pressure on each side thereof to facilitate absolute smoothness of operation, and in another position to exhaust air from both sides of the piston and from the jar actuating mechanism.

A still further object of the invention is to provide molding machine and valve mechanism applicable to that class of molding machines in which, in addition to the jarring table or jarring and lifting table, piston and cylinder means are provided for the purpose of raising and lowering a flask and mold with respect to the jarring table.

Further objects and advantages of the invention will appear from the following description taken in connection with the accompanying drawings, which illustrate, by way of example, preferred embodiments of the invention, but which are not to be taken as a definition of the limits thereof, reference being had to the appended claims for that purpose.

In the drawings:

Fig. 1 is a sectional elevation through part of the jarring table and associated mechanism of a molding machine, embodying therein one form of the present invention and showing the parts in position of rest;

Fig. 2 is a similar view of the same parts, showing the mechanism in position for jarring;

Fig. 3 is a similar view, showing the same parts in the positions occupied when the table is lifted without jarring;

Fig. 4 is a sectional elevation, illustrating the interior of one form of control valve with its associated conduits;

Figs. 5, 6 and 7 are top plan view of the control valve of Figs. 1 to 4 inclusive, illustrating the valve parts successively in the positions they occupy in jarring, at rest, and in lifting the table without jarring;

Figs. 8, 9, 10 and 11 are top plan diagrammatic views of another form of control valve, illustrating the valve parts successively in the positions of jarring, exhaust or at rest, long lift without jarring, and for holding the flask in lifted position;

Figs. 12, 13, 14 and 15 are similar views of another form of control valve, illustrating the parts successively in the positions of jarring, exhaust or at rest, long lift without jarring, and for holding the flask in lifted position;

Fig. 16 is a sectional elevation through the control valve of Figs. 8 to 11 inclusive, taken on the line 16—16 of Fig. 9 and illustrating somewhat diagrammatically and on a reduced scale in side elevation, a molding machine including the actuating valve of Figs. 1 to 3, a jarring table and a flask lifting cylinder and piston, together with the necessary pipes or conduits connecting the parts;

Fig. 17 illustrates, in sectional elevation, the control valve of Figs. 12 to 15 in the position of Fig. 13 and taken on the line 17—17 of said figure, and also showing, somewhat diagrammatically and in side elevation on a reduced scale, the associated parts of a molding machine including a jarring and lifting table provided with the actuating valve mechanism of Figs. 1 to 3 and also including a flask raising and lowering cylinder and piston independently controlled by the valve of Figs. 8 to 11.

Referring now in detail to the drawings, and particularly to Figs. 1 to 3 inclusive, there is shown approximately half of a jarring table and associated mechanism, which in the present instance includes a jarring table 11 provided around its edges with a depending annular flange 12, and interiorly thereof on its under side with a plurality of downwardly extending jarring bosses 13 adapted to contact at the limit of downward movement of the table respectively with a plurality of anvil portions 14 provided on the horizontal upper portion of a cylinder member 15 and surrounded by the upwardly extending annular flange 16 adapted, in the lower position of the table, to be received within the flange 12 thereof.

The cylinder portion proper is closed at its bottom, as at 17, and is open at its top to receive the piston member 18, which carries at its upper end the table 11 secured to the piston by bolts 19 or other suitable means. Any desired form of air-tight packing 20 is preferably provided at the upper end of the cylinder 15 between it and the piston.

The horizontal portion of the cylinder member 15 is provided with a vertical guide bearing 26 extending therethrough and receiving therein the depending pilot valve actuating rod 27 secured to the under side of the operating table 11 by the internally screw-threaded depending boss 28 and lock nut 29, or by other suitable means.

In connection with the foregoing construction, the invention provides automatic valve mechanism capable of accomplishing a plurality of functions, including automatic and continuous jarring of the table 11 and lifting the table 11 smoothly without jarring. The present embodiment of the actuating valve mechanism includes a valve casing 32, which may have conduit connection with the cylinder 15 below the piston 18, but in the present instance is shown as being secured to the cylinder 15 near the bottom thereof and communicating with the interior of the cylinder 15 through the conduit 33 provided in the cylinder wall, and the opening 34 provided in the valve casing 32 adjacent the cylinder conduit 33.

Within the valve casing 32 is located the reciprocating differential sleeve valve 36, which is preferably in the form of a hollow cylinder having a greater interior and exterior diameter at one end than the other, thus forming a shoulder portion 37 between its ends. An opening 39 is provided through the wall of the valve 36, and, in the lowered position of said valve, is adapted to form a continuation of the passages 33 and 34 and to exhaust fluid such as air from the interior of the cylinder 15 through the passages 33 and 34 into the interior of the sleeve valve 36 and out into the atmosphere through the exhaust opening 39 formed in the bottom of the valve casing 32 and at all times in open communication with the interior of the sleeve valve 36.

The sleeve valve 36 is guided rectilinearly in its vertical movement by the guide pin 41, which passes through a guide opening formed in a guide opening lug or flange formed on or secured interiorly of the sleeve valve 36. The upper open end of the valve casing 32 is closed by a head 43 secured thereto by bolts 44 or otherwise and provided with the downwardly extending annular flange 45 received interiorly within the larger diametered upper end of the sleeve valve 36. Suitable air-tight packing is provided between the flange 45 and sleeve valve 36 and between sleeve valve 36 and the valve casing 32 to prevent leakage of air between these parts.

It will be noted that the sleeve valve 36 is so proportioned and constructed that the shoulder 37 of the sleeve valve 36 provides a fluid pressure receiving surface and that the upper annular end of the sleeve valve 36 forms another fluid pressure receiving surface of effectively greater area than that formed by the shoulder 37. The interior projection formed by the shoulder 37 provides an abutment which, in the upper position of the sleeve valve, contacts with the lower end of the flange 45, thus limiting the upward movement of the valve so that at all times the upper annular fluid pressure receiving face 46 of the valve forms the lower end of an upper annular expansible chamber 47. The lower end of the sleeve valve, contacting with the bottom of the casing 32, limits the downward movement of the sleeve valve to provide the lower expansible chamber 48. Obviously, the terms "upper" and "lower" referring to these annular chambers have reference to their positions as illustrated in the drawings only, but the valve parts could be inverted or the entire casing inverted without departing from the invention.

The expansible chamber 47 is at all times in communication with the passage 51 leading to the pilot valve chamber 52, and the expansible chamber 48 is at all times in communication with the passage 53 formed in the valve casing 32 and communicating freely with the actuating valve conduit 54. In the upper position of the sleeve valve 36, as in Figs. 2 and 3, the chamber 48 communicates through passages 34 and 33 with the interior of the cylinder 15, and thereby forms a continuous passage from the interior of cylinder 15 through passages 33 and 34, annular chamber 48, and passage 53 to the actuating valve conduit 54. In the lower position of the sleeve valve 36, the interior of the cylinder 15 communicates through passages 33 and 34, and passage 39 in the sleeve valve (see Fig. 1) with the interior of the sleeve valve and through the bottom opening 39 in the valve casing with the outside atmosphere.

Located in the pilot valve chamber 52 for vertical reciprocating movement therein, is the pilot valve 58, herein shown as in the form of a solid cylinder, provided with the upwardly extending guide rod 59 having the head 60 adapted at certain times to contact with the lower end of the depending pilot valve actuating rod 27. Above the pilot valve 58, the pilot valve chamber 52 is in open communication with the atmosphere through the opening 64 extending through the valve casing, and below the pilot valve 58, the pilot valve chamber 52 communicates with the pilot valve conduit 65. When the pilot valve 58 is in its lower position, as shown in Fig. 1, the annular chamber 47 communicates through passage 51 with the pilot valve chamber 52 and thence through passage 64 with the outside atmosphere. When the pilot valve 58 is in its upper position, as shown in Fig. 2, the annular chamber 47 communicates through passage 51 with the lower portion of the pilot valve chamber 52 and thence with the pilot valve conduit 65.

In order to insure perfect smoothness and evenness of operation of the jarring and lifting table 11 during lifting and lowering of the table without jarring, the table piston 18 is provided with differential fluid pressure receiving surfaces, one of these being indicated at 68 in the cylinder 15 below the piston head 69, and the other, of less effective area, being indicated at 70 within the cylinder 15 on the top face of the piston head 69 and forming an annular expansible chamber 72 between the reduced portion of the piston 18 and the interior of the cylinder wall 15. In lifting the table 11 by means of the piston 18, fluid such as air under pressure is admitted to the chamber 68 below the piston acting upwardly on the piston to cause it to lift the table. Fluid from the same source and at the same pressure is admitted through pipe 74 into chamber 72 above the piston face 70, thus acting in opposition to the upwardly exerted pressure, but by reason of the relatively small area of the annular piston face 70, permitting the piston to continue its upward movement, but insuring a steadiness, evenness and smoothness of motion otherwise not secured.

The operation of the actuating and pilot valve during automatic jarring is as follows:

Air or other fluid under pressure is admitted from the same source and at the same pressure into pipes 54 and 65. Assuming at this time that the parts are in the position of Fig. 1, upward pressure will be exerted upon the pilot valve 58, but at this time the valve 58 will not move upwardly by reason of the fact that the rod 27, contacting with head 60, holds the pilot valve down. Pressure introduced through pipe 54 into annular chamber 48 causes the sleeve valve 36 to rise to the limit of its upward movement, thus causing chamber 48 to communicate through passages 34 and 33 with cylinder chamber 68 below table piston 69. The pressure thus exerted on piston 69 causes the piston to move upwardly, carrying with it the table 11. As the table 11 moves upwardly, rod 27 is carried upwardly with it, and by reason of the pressure exerted below the pilot valve 58, the pilot valve moves upwardly with the head 60 contacting with the upwardly moving rod 27 during this movement. Any air that might otherwise be trapped above the pilot valve 58 exhausts through channel 64. When the pilot valve reaches its limit of upward movement, as shown in Fig. 2, it uncovers passage 51, thus admitting air under pressure from the pilot valve chamber 52 through the passage 51 into the annular chamber 47 above the enlarged upper end of the sleeve valve 36. By reason of the greater effective area of the pressure receiving surface 46, which, as described, exceeds the effective area of the shoulder 37 in annular chamber 48, the sleeve valve 36 is forced downwardly to its lowermost position. In moving downwardly, the sleeve valve 36 passes the opening 34 and shuts off this opening from the annular chamber 48, thus cutting off the supply of air under pressure to the table lifting chamber 68. When the sleeve valve 36 reaches its lowermost position, (see Fig. 1), the exhaust passage 39 in sleeve valve 36 arrives opposite the passage 34 in the valve casing and permits the air under pressure trapped in chamber 68 to pass through passages 33, 34 and 39 into the hollow interior of the sleeve valve 36 and thence out through the valve casing opening 39 to the outside atmosphere. The sizes of the passages and openings are sufficient to insure that this exhaust action will occur practically instantaneously, thus causing the piston 18 and table 11 to drop suddenly to the limit of the downward movement of the table 11, the bosses 13 striking upon anvils 14 and producing the desired jar for a sand mold resting on the table 11. In the downward movement of the table 11, however, the depending pilot valve actuating rod 27 moves downwardly with the table and, contacting with head 60 of the pilot valve 58, forces the pilot valve downwardly to its lowermost position, closing the passage 51 and thus cutting off the supply of air under pressure in the chamber 47. When the pilot valve reaches its lowermost position, as shown in Fig. 1, the annular chamber 47 is open to the outside atmosphere to which the air under pressure trapped in the annular chamber 47 passes through channel 51 into pilot valve chamber 52 above pilot valve 58 and through passage 64 in the valve casing. The moment this exhaust action takes place with respect to the chamber 47, there is no longer sufficient pressure upon the upper end of the sleeve valve 36 to cause it to remain in its downward position against the effect of the upwardly exerted air pressure upon the shoulder 37, and the sleeve valve 36, under this pressure, immediately moves to its uppermost position, closing the channel from lifting chamber 68 to the outside atmosphere by reason of the port 39 moving upwardly beyond the opening 34 and again causing the expansible chamber 48 to communicate through this opening with channel 33 and thus with the expansible lifting chamber 68, causing the piston 18 and table to rise again for the next jar, during which time the pilot valve moves upwardly against, and follows in its upward movement, the rod 27, and the jarring action already described is repeated. It is to be observed that this action is entirely automatic and that as long as air is admitted simultaneously to the pipe lines 54 and 65 the jarring action will continue.

In a preferred embodiment of the invention, as illustrated in Figs. 1 to 4 inclusive, a single hand-operated control valve is provided, and by operation of a single lever is adapted to be moved to different positions to cause continuous jarring, or long lift without jarring, or to bring the parts to lowered position or position of rest.

Referring to Figs. 1 to 4 inclusive, a stationary control valve disc 81 is provided, through which extend axially a plurality of openings or passages, as shown particularly in Fig. 4. The passage 82 is connected by a pipe line 83 with a source of air or other fluid under pressure. The passage 84 in the valve body or plate 81 is connected directly to pipe line 54, already described and leading to the actuating valve 36. The passage 85 is connected directly to pipe line 65 leading, as above described, to pilot valve 58. The central passage 86 is connected directly with an exhaust pipe line 87, which is open to the outside atmosphere. The passage 89 connects directly with pipe line 74, already described and leading to expansible chamber 72 above the piston 69.

A rotatable floating disc valve 93 rests upon the plate 81 and is formed on its under side with the undercut portion 94 having the shape shown in plan view in dotted lines in Figs. 1, 5, 6 and 7. The valve disc 93 also has formed therein a plurality of passages or openings, as shown particularly in Figs. 5 to 7 inclusive, and including an opening 96 adapted to be brought over passage 84 and pipe line 54 to admit air into said pipe line; a smaller passage 97 adapted to be brought over the passage 85 to admit air to the pipe line 65; a passage 98 adapted to be brought over opening 89 to admit air to pipe line 74, and a passage 100 adapted to be brought over opening 84 to admit air to pipe line 54.

The floating disc valve 93 is provided on its upper face with an annular flange 103, within which is received a coil compression spring 104 and the lower flange of an actuating shaft 105, the spring 104 exerting upward pressure against said shaft and downward pressure against the disc valve 93. The lower flange of the shaft 105 is keyed, as at 107, to the flange 103 of the disc valve, so that rotation of the shaft will cause rotation of the valve. An air-tight cap plate 109 is provided over the valve disc 93 and has air-tight connection with the valve plate 81. An actuating handle 110 is made fast to the actuating shaft 105 in any suitable manner. A suitable opening 111 is provided in the valve cap 109 to admit air or other fluid under pressure to the chamber 112 above the valve 93. The construction is such that the chamber 112 always contains air under pressure.

Referring now particularly to Figs. 5, 6 and 7, the functions accomplished by moving the valve handle successively to the three positions shown are as follows: As has been stated, the chamber 112 is at all times filled with air under pressure. In the position of rest of the control valve (Fig. 6), the openings 96, 97, 98 and 100 in the valve are directly over solid portions of the stationary valve plate 81, and consequently no air is admitted to any of the pipe lines 54, 65 or 74, and the positions of the jarring table, actuating valve 36 and associated mechanism are as shown in Fig. 1. The angularly shaped depression in the lower face of the rotatable valve disc 93, in the position of Fig. 6, connects the pipe lines 54 and 65 and passages 84 and 85 with the exhaust passage 86 and exhaust pipe line 87. Any air under pressure which has existed in the chamber 68 or in the actuating valve or in the pilot valve is thus exhausted.

Assuming now that it is desired to jar the table, the handle 110 is moved to the position of Fig. 5. The result of this is to bring the passages 96 and 97 in the rotatable valve disc directly over the passages 82 and 85 in the stationary plate 81, and air under pressure passes from the supply line 83, passages 82, 111 and chamber 112 into the pipe lines 54 and 65. As hereinabove described, the actuating and pilot valves are thus operated to produce continuous jarring. It is also to be noted that with the valve handle 110 in the position of Fig. 5, any air that may have been trapped in the chamber 72 is exhausted through pipe line 74, passage 89 in the stationary valve disc, into the short arm of the depression 94, thence to the exhaust passage 86 in the valve plate 81 and through the exhaust pipe line 87 to the outside atmosphere.

When the table 11 has been jarred sufficiently, the valve handle 110 is moved to the position shown in Fig. 6. This brings the passages 96 and 97 in the rotatable valve 93 out of alignment with the passages 82 and 85 in the stationary valve plate 81, and so cuts off the supply of air under pressure to the pipe lines 54 and 65, causing the jarring action to cease. At the same time channel 94 now overlies and connects passages 84, 85 and 86, the result of which is that air in the pipe lines 54 and 65 passes through channel 94, into opening 86 and thence through exhaust pipe line 87 to the outside atmosphere. This again brings the parts of the table, actuating valve, pilot valve and associated mechnism to the position of Fig. 1.

Assuming now that it is desired to give the table 11 a so-called long lift without jarring, the handle 110 of the control valve is moved to the position of Fig. 7. This brings the openings 96 and 97 in the rotatable valve 93 over solid portions of the valve plate 81, and also brings the openings 100 and 98 in the rotatable valve 93 directly over passages 82 and 89 respectively in the valve plate 81, thus opening communication from the chamber 112 to the pipe lines 54 and 74. As hereinbefore described, the table 11 will be given a long lift without jarring. The air pressure thus exerted is not only sufficient to lift the table 11, but also to hold it in lifted position until the handle 110 is moved back again to the position of Fig. 6, thus cutting off the supply of air to the pipe lines 54 and 74 by reason of the fact that passages 100 and 98 are moved over solid portions of the plate 81, and causing exhaust of air from the pipe line 54, through passage 84, channel 94, passage 86, into pipe line 87 and thence to the outside atmosphere. At this time pipe line 74 and chamber 72 contain entrapped air under pressure. This entrapped air, if the next operation of the machine is jarring, for which the valve handle 110 is moved to the position of Fig. 5, is exhausted through channel 94, passage 86 and pipe line 87; if the long lift without jarring is to be repeated, this air is not exhausted, but when the handle 110 is moved to the position of Fig. 7, is again in open communication with the supply of air under pressure in chamber 112.

In some instances, for example in my copending application Serial No. 142,540, filed October 19, 1926, it is desirable to utilize, in connection with the jarring table, lifting mechanism for the flask for raising said flask above the jarring table. Suitable mechanism for this purpose is illustrated diagrammatically in Figs. 16 and 17 and comprises the lifting cylinder 118 adapted to support and raise the flask with respect to a stationary piston 119 fixed within a flange or boss 120 in a bed plate 121 of the machine. The jarring table 11 and its associated mechanism including the actuating valve casing 32, actuating valve 36, pilot valve 58 and associated mechanism, are also provided, as shown in Figs. 16 and 17. In some instances it has been found desirable to modify the control valve, as shown in Figs. 8, 9, 10, 11 and 16, so that by operation of a single handle 110, the control valve, when in one position, will cause air under pressure to be delivered to the pilot valve and actuating valve for causing continuous and automatic jarring of the table 11, and when in another position, will cut off the supply of air to the table lifting mechanism and deliver a supply of air under pressure to the flask carrying cylinder 118, causing it to move upwardly with respect to the stationary piston 119 received within said cylinder. Figs. 8, 9, 10 and 11 illustrate diagrammatically four positions of the valve shown in sectional elevation in Fig. 16. The channel 94' on the under side of the floating rotatable valve disc 93' extends radially, as shown, on either side of the center of said disc, and also circumferentially for a short distance, as shown at 130. In the case now under consideration, an air supply pipe line 83' is provided to deliver a supply of air under pressure to the chamber 112' above the valve disc 93'. A central passage 86' is provided in the valve plate 81' and is connected to an exhaust pipe line 87', which is open to the outside atmosphere. The passage 84' provided in the valve plate 81' is connected by a pipe line 54' leading to the actuating valve 36 in casing 32, and a branch of which, indicated at 65', leads to the pilot valve 58. A supply of air under pressure, therefore, into pipe line 54' and hence to the actuating valve and control valve will cause continuous and automatic jarring of the table 11 as hereinabove described. A pipe line 132 leading from the chamber between the cylinder 118 and stationary piston 119 connects with a passage 134 provided in the stationary valve plate 81', and air under pressure delivered to the pipe line 132 causes the cylinder 118 to rise in known manner. Passage 133 through the rotatable valve disc 93' is adapted at times to be brought over passage 134 to admit air under pressure to pipe line 132 for long lift without jarring; and passage 96' in the rotatable valve 93' is at times adapted to be brought over the passage 84' to admit air under pressure into pipe line 54' for continuous jarring. As illustrated in Figs. 8 to 11 inclusive, the exhaust channel 94' is at all times in communication with the exhaust outlet 86'.

The operation of the control valve of Figs. 8 to 11 and 16 is as follows: Assuming the valve to be in the position shown in Figs. 9 and 16, any air in pipe lines 54' and 132 will be exhausted through channel 94', into exhaust passage 86', thus permitting all parts of the machine to remain in lowered position. Assuming now that it is desired to jar the table 11, the valve handle 110' is moved to the position of Fig. 8, thus bringing the passage 96' directly over the passage 84' and delivering a supply of air under pressure into pipe line 54' for causing continuous and automatic jarring, as hereinabove described. When sufficient jarring has taken place, the handle 110' is moved to the exhaust position of Fig. 9, permitting exhaust of air from pipe line 54', through passage 84', channel 94', passage 86', into the exhaust pipe line 87'. The table 11 may be jarred again by moving the handle to the position of Fig. 8, or the flask may be lifted with respect to the table 11 by moving the handle to the position of Fig. 10, thus bringing the passage 133 of the valve over the passage 134 in the valve disc and admitting air from chamber 112', into pipe line 132, thence to the lifting cylinder 118 for long lift without jarring, as already described. While the flask is being rolled over, it may be maintained in raised position by moving the handle to the position of Fig. 11, which cuts off the supply of air under pressure to pipe line 132 by moving valve passage 133 away from its position over valve plate passage 134, but not sufficiently far to bring the exhaust channel 130 of the valve disc over the plate passage 134. The air entrapped in the pipe line 132 and cylinder 118 causes the cylinder, and hence the flask, to remain in raised position. To lower the flask, the handle is brought again to the position of Fig. 9, in which exhaust passage 94' connects pipe line 132 with the exhaust pipe line 87, causing the cylinder, and hence the flask, to be returned to lowered position.

In certain types of machine such, for example, as those provided with a squeeze head or plate, it has been found desirable to provide not only a jarring table and flask lifting cylinder, but also a control valve for giving the jarring table a long lift without jarring. An example of suitable valve mechanism embodying the present invention with such a machine is illustrated in Figs. 12 to 15 and 17. A jarring table 11 is provided, as before, with its associated lifting piston and cylinder, an actuating valve casing 32 containing the actuating valve and pilot valve and associated mechanism shown in Figs. 1 to 3. The flask lifting cylinder 118 is movable upwardly with respect to a stationary piston 119 fixed in the boss or flange 120 upon the machine foundation or base 121. A separate valve 142 operated by handle 143 and having any suitable inlet and exhaust and connected to pipe line 132 for raising and lowering the cylinder 118 is provided. The function of this valve is to raise the flask carrying cylinder, maintain it in raised position, and lower it to lowermost position. For this purpose the valve 142 may be identical with the valve of Figs. 5 to 7 inclusive, or may be identical with the valve of Figs. 8 to 11 inclusive, any suitable stop lug, plugs or other means being provided to prevent the handle of the valve from being effectively moved to jarring position, shown in Figs. 5 and 8 respectively.

The control valve for jarring and for lifting the table 11 in this embodiment of the invention, illustrated diagrammatically in Figs. 12 to 15 and in vertical section in Fig. 17, is constructed as follows: The stationary valve plate 81'' is provided, as before, with a plurality of air passages, the central passage 86'' communicating with the exhaust pipe line 87'', the passage 85'' connecting with pipe line 65'' leading to pilot valve 58; and the passage 84'' connected with pipe line 54'' leading to actuating valve 36. Air under pressure admitted to both pipe lines 65'' and 54'' will, as hereinbefore described, cause continuous and automatic jarring of the table 11. For long lift without jarring, air under pressure is admitted to pipe line 54'' alone, and consequently to actuating valve 36, without any air supply to the pilot valve. Three passages are provided through the rotatable valve 93'' as follows: The passage 144 adapted to communicate with passage 84'' and pipe line 54''; the passage 145 adapted to communicate with passage 85'' and pipe line 65'' at the same time air is admitted through passage 144 into pipe line 54''; and the passage 146 adapted to communicate with the passage 84'' and pipe line 54'' without admission of any air into pipe line 65''. The under side of the rotatable valve 93'' is provided with the radial exhaust channel 94''.

When the handle 110'' of the control valve is in the position of Fig. 13, any air in either of the pipe lines 54'' or 65'' is exhausted through exhaust channel 94'', into passage 86'' and through exhaust pipe line 87'' to the outside atmosphere. For jarring, the handle is moved to the position of Fig. 12, bringing the air admitting passages 144 and 145 of the rotatable valve directly over the pipe line passages 84'' and 85'', thus admitting air simultaneously to pipe lines 54″ and 65″ and thence simultaneously to actuating valve 36 and pilot valve 58 respectively, thereby causing continuous jarring, as hereinbefore described. The handle is then brought to the position of Fig. 13 to exhaust air from the two pipe lines 54″ and 65″. To lift the table 11 without jarring, the handle is brought to the position of Fig. 14, bringing the passages 144 and 145 in the valve over solid portions of the plate 81″ and bringing passage 146 in the valve over passage 84″ in the valve plate, thus admitting a supply of air into pipe line 54″ and then to actuating valve 36 in casing 32 for lifting the table without jarring, as hereinbefore described, but not admitting any air into pipe line 65″. To hold air entrapped in pipe line 54″ to maintain table 11 in lifted position, the control valve is moved to the position of Fig. 15, in which the air admitting passage 146 of the valve has moved away from its position over the pipe line 54″, but the exhaust channel 94″ has not yet moved over the pipe line 54″ to exhaust air therefrom. To lower the table, the valve is brought to the position of Fig. 13, permitting exhaust of air from pipe line 54″, through passage 84″, exhaust channel 94″, passage 86″, into the exhaust pipe line 87″.

It will thus be seen that effective means are provided by the present invention to produce continuous and automatic jarring, together with means for lifting the operating table without jarring, which means, because of the differential piston 18, is exceptionally even and smooth in operation; that the reversing action of the jarring actuating valve is automatically controlled by a pilot valve associated both with the jarring table and with the source of fluid under pressure, and automatically operated; that the invention provides a single control valve which, in one position, is adapted to cause continuous and automatic jarring of the table, in another position is adapted to bring all the parts to position of rest, and in another position is adapted to lift the operating table without jarring by admitting air to both sides of the table piston simultaneously. It is also to be noted that to produce the jarring action, the air supply is delivered simultaneously to the pilot valve and actuating valve.

The invention also provides a single control valve by means of which the jarring table is actuated and also by means of which a flask may be raised above and lowered down upon the jarring table; and in one embodiment of the invention not only may the operating table be jarred, but may be lifted without jarring, and the flask may be raised and lowered with respect to the operating table.

What is claimed is:
1. In a molding machine, a jarring table, piston and cylinder means associated therewith for jarring said table, and automatic jarring valve mechanism associated therewith including an actuating valve having a central exhaust passage and a piston pilot valve automatically governing the same, and moved in one direction by fluid pressure and in the opposite direction by said jarring table.

2. In a molding machine, a lifting and jarring table, piston and cylinder means for lifting and for jarring said table, said piston having two opposed actuating surfaces, an actuating valve and pilot valve therefor operatively connected through said cylinder with one face of said piston, a conduit leading through said cylinder to the other face of said piston, a conduit leading from said actuating valve, a conduit leading from said pilot valve, and a control valve associated with all of said conduits and adapted in one position to admit fluid under pressure to both actuating surfaces of said piston, and in another position to admit fluid under pressure to said actuating valve and to said pilot valve.

3. In a molding machine, a lifting and jarring table, a table lifting member having a fluid pressure receiving surface, valve mechanism controlling the admission of fluid to said member and including an actuating valve and a pilot valve therefor, and means for admitting fluid under pressure to both of said valves to cause said actuating valve to deliver fluid intermittently to said pressure receiving surface to produce automatic and continuous jarring of said table, and for admitting fluid under pressure to said actuating valve alone to deliver fluid to said pressure receiving surface to cause lifting of said table without jarring.

4. In a molding machine, a jarring and lifting table, a jarring and lifting piston secured to said table, valve mechanism controlling the admission of air to said piston including an actuating valve and a pilot valve therefor, and means operable in one position to admit air under pressure to both of said valves simultaneously to cause said actuating valve to deliver air intermittently to said piston to produce automatic and continuous jarring of said table, and operable in another position to admit air under pressure to said actuating valve alone for lifting said table without jarring.

5. In a molding machine, a jarring and lifting table, a jarring and lifting piston secured to said table and having opposed fluid pressure receiving surfaces, valve mechanism controlling admission of air to one of said surfaces including an actuating valve and a pilot valve therefor, and means operable in one position to admit air under pressure to both of said valves to cause said actuating valve to deliver air intermittently to said last named pressure receiving surface to produce automatic and continuous jarring of said table and operable in another position to admit air to both of said opposed fluid pressure receiving surfaces simultaneously for lifting said table against air pressure without jarring.

6. In a molding machine, a jarring and lifting table, a jarring and lifting piston secured to said table, valve mechanism controlling the admission of air to said piston including a reciprocating actuating valve having a central exhaust passage and a pilot valve for said actuating valve, and means operable in one position to admit air under pressure to both of said valves simultaneously to produce automatic and continuous jarring of said table and in another position to admit air under pressure to said actuating valve alone to lift said table without jarring.

7. In a molding machine, a jarring and lifting table, a jarring and lifting piston carrying said table, valve mechanism controlling the admission of air to said piston including an actuating valve having two pressure receiving surfaces, one of said surfaces being of greater area than the other, and a pilot valve for said actuating valve, and a single operating member operable in one position to admit air under pressure to both of said valves simultaneously to produce automatic and continuous jarring of said table, and in another position to admit air under pressure to said actuating valve alone to lift said table without jarring.

8. In a molding machine, a jarring and lifting table, a jarring and lifting piston carrying said table, valve mechanism controlling the admission of air to said piston including a reciprocating actuating valve having a central exhaust passage and having two opposed pressure receiving surfaces, one of said surfaces being of greater area than the other, and a pilot valve for said actuating valve, and a single lever operable in one position to admit air under pressure to both of said valves simultaneously to produce automatic and continuous jarring of said table, and in another position to admit air under pressure to said actuating valve alone to lift said table without jarring.

9. In a molding machine, a jarring and lifting table, a jarring and lifting piston carrying said table, valve mechanism controlling the admission of air to said piston including an actuating valve having two pressure receiving surfaces, one of said surfaces being of greater area than the other, and a pilot valve for said actuating valve having a pressure receiving surface at one end only, and a lever operable in one position to admit air under pressure to both of said valves simultaneously to produce automatic and continuous jarring of said table, and in another position to admit air under pressure to said actuating valve alone to lift said table without jarring.

10. In a molding machine, a jarring and lifting table, a jarring and lifting piston carrying said table, valve mechanism controlling the admission of air to said piston including an actuating valve having two pressure receiving surfaces, one of said surfaces being of greater area than the other, and a pilot valve for said actuating valve and movable in one direction by fluid pressure and in the opposite direction by said jarring and lifting table, and a controlling member operable in one direction to admit air under pressure to both of said valves simultaneously to produce automatic and continuous jarring of said table, and in another direction to admit air under pressure to said actuating valve alone to lift said table without jarring.

In testimony whereof I affix my signature
EDWARD HARMES.